United States Patent [19]

Potter et al.

[11] Patent Number: 5,500,114

[45] Date of Patent: Mar. 19, 1996

[54] SEPARATOR DEVICE

[75] Inventors: Michael S. Potter, Lickey; Arthur S. Pittwood, Brewood, both of Great Britain

[73] Assignee: Managed Pollution Systems Limited, Worcestershire, England

[21] Appl. No.: 295,756

[22] PCT Filed: Feb. 15, 1993

[86] PCT No.: PCT/GB93/00312

§ 371 Date: Sep. 1, 1994

§ 102(e) Date: Sep. 1, 1994

[87] PCT Pub. No.: WO93/17775

PCT Pub. Date: Sep. 16, 1993

[30] Foreign Application Priority Data

Mar. 6, 1992 [GB] United Kingdom ............... 9204979

[51] Int. Cl.$^6$ .................................................. B01D 33/11
[52] U.S. Cl. ..................... 210/394; 210/396; 210/398; 210/403
[58] Field of Search .............................. 210/391, 394, 210/396, 398, 402, 403, 407

[56] References Cited

U.S. PATENT DOCUMENTS

| 292,947 | 2/1884 | Porter | 210/403 |
| 4,140,629 | 2/1979 | Martindale | 210/403 |
| 4,202,773 | 5/1980 | Fink et al. | 210/403 |
| 4,248,709 | 2/1981 | Irving | 210/403 |
| 4,439,320 | 3/1984 | Blok | 210/394 |
| 4,632,753 | 12/1986 | Jacobsen et al. | 210/403 |
| 4,755,291 | 7/1988 | Lee | 210/403 |
| 4,976,853 | 12/1990 | Lee | 210/391 |
| 5,133,860 | 7/1992 | Tai | 210/403 |

FOREIGN PATENT DOCUMENTS

| 411666 | 6/1934 | United Kingdom . |
| 822865 | 11/1959 | United Kingdom . |
| 2216031 | 10/1989 | United Kingdom . |
| WO88/03433 | 5/1988 | WIPO . |

Primary Examiner—Christopher Upton
Attorney, Agent, or Firm—Staas & Halsey

[57] ABSTRACT

A separator device for separating solid material from liquid, particularly in sewage, has an outer casing with respective solid material and liquid outlets, a drum rotatable within the casing and formed of mesh panels for flow of liquid therethrough, spirals within the drum for moving the solid material within the drum, upon rotation, towards an outlet therefrom position above the solid material outlet of the casing, the spirals being each supported at their outer periphery by the periphery of the drum and at their inner periphery by an inlet feed tube and/or a central driven shaft of the drum, and in-line bearings around the shaft and a journal outside respective opposite ends of the casing.

9 Claims, 3 Drawing Sheets

SEPARATOR DEVICE

BACKGROUND OF THE INVENTION

1. Field of the Invention

This invention relates to a separator device for separating solid material from liquid.

SUMMARY OF THE INVENTION

An object of the invention is to provide such a separator device in an improved manner.

According to the invention a separator for separating solid material from liquid comprises a casing having separate respective solid material and liquid outlets therefrom, a drum rotatable within the casing through which liquid can flow, in use, to said liquid outlet, means within the drum for moving said solid material within the drum, as it rotates in use, towards an outlet therefrom where it passes to said solid material outlet of the casing, said means for moving said solid material being supported for at least part of the length thereof at the outer periphery thereof and for at least part of the length thereof at the inner periphery thereof, an inlet member for supplying a mixture of said solid material and said liquid into the drum, and one end of the drum and/or said inlet member having a journal received in a bearing outside of one end of the casing, at the other end of which the drum and/or the inlet member is or are rotatably driven, in use.

BRIEF DESCRIPTION OF THE DRAWINGS

The invention will now be described, by way of example only, with reference to the accompanying drawings, in which.

DETAILED DESCRIPTION

The drawings show a separator device which is particularly intended for use with sewage and the like and is generally known as a screen.

Figure 1:
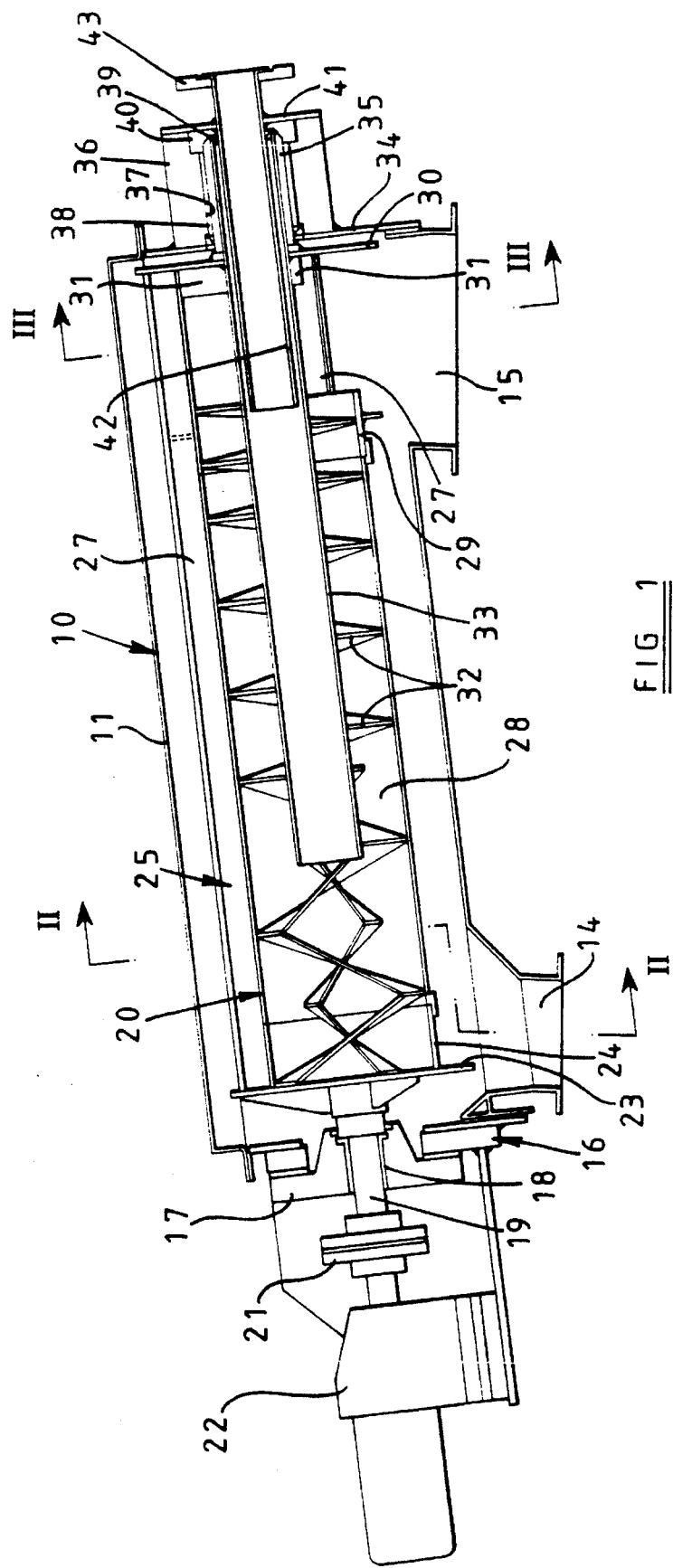
FIG. 1 is a longitudinal section through a separator of the invention.
Figure 2:
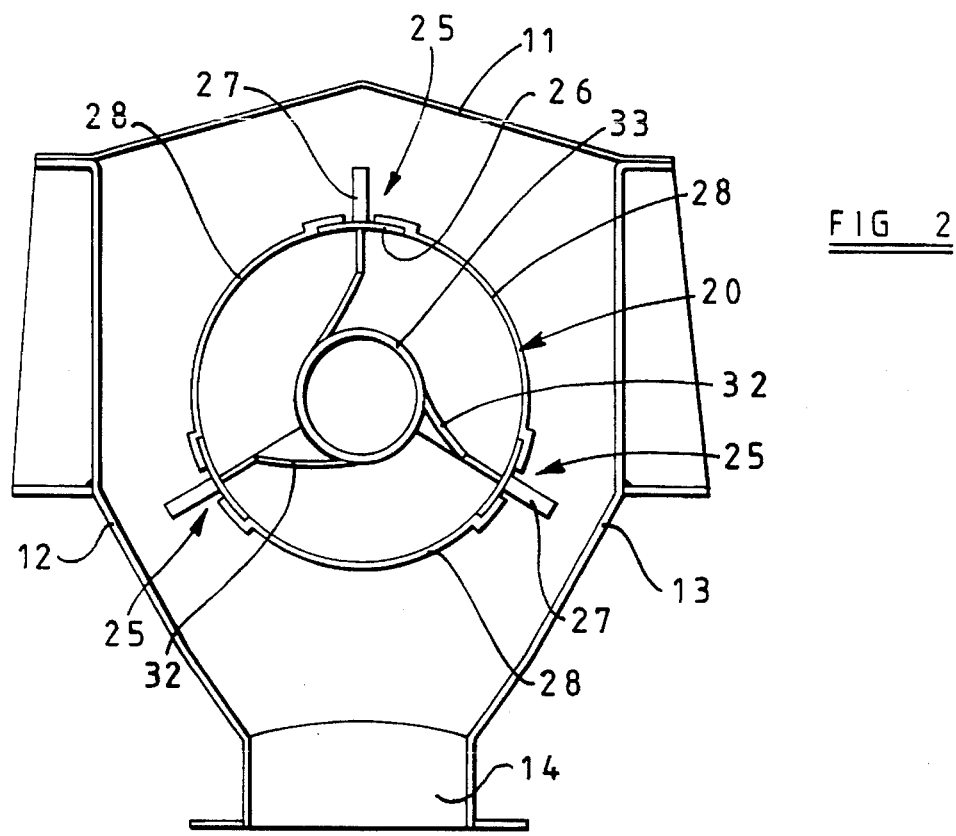
FIGS. 2 and 3 are sectional views on the lines II—II and III—III respectively in FIG. 1, to a larger scale.
Figure 3:
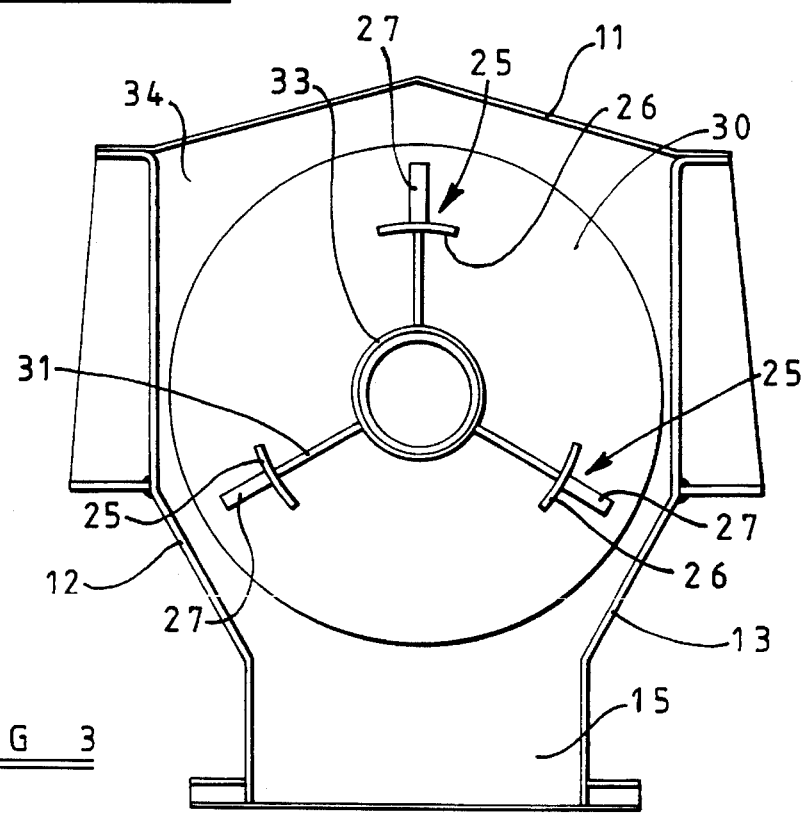

The screen of FIGS. 1 to 3 has an outer casing 10 made up of an upper removable cover part 11 which is fixed to longitudinal side parts 12, 13 respectively. The two side parts connect together at the bottom of the screen, the casing being closed along most of its lower part but having a liquid outlet 14 at one end and a solid material outlet 15 at its opposite end. As can be seen from FIG. 1, the casing slopes downwardly from the outlet 15 to the outlet 14, so that, as will be described, separated liquid drains to said outlet 14 where it is removed from the screen. The transverse cross-sectional shape of the casing can be seen from FIGS. 2 and 3.

At the end of the casing adjacent the outlet 14, there is a composite end plate assembly 16 which carries a support housing 17. This has a central opening in which is received radial and thrust bearings 18 which carry a journal 19 which extends from an end of a drum 20, which is disposed in the casing 10 as will be described. The journal 19 extends from the housing 17 away from the casing to a position where it is connected via a flexible coupling 21 to a drive unit 22 for rotating the journal 19 and thus the drum 20.

The drum 20, has its central axis at the same inclination as the casing 10 previously described. At its end where it is driven, the drum is closed by a circular end plate 23, from which the journal 19 extends. Centrally connected inwards of this plate 23 is a cylindrical ring 24. Connected to the ring 24 and extending longitudinally therefrom in an inwards direction away from the plate 23 are three rigid drum body members 25, each member 25 extending parallel to the axis of the drum defined by the centre of the plate 23, the members 25 being equi-angularly spaced around the ring 24 and thus the drum itself. As can be seen from FIG. 2, each member 25 comprises a short arcuate portion 26 of substantially the same radius as the ring 24 from which perpendicularly extends a rib part 27. Extending longitudinally from the ring 24 between the members 25 respectively are three mesh panels 28, shown in FIG. 2. These mesh panels are each of arcuate form and together with the arcuate portions 26 of the members 25 form the circular drum 20 which has a diameter substantially corresponding to that of the ring 24. The mesh panels 28 extend to a further cylindrical ring 29 which is axially positioned where the closed underneath of the casing 10 opens to form the solid material outlet 15. Although the three mesh panels 28 terminate at the ring 29, the three members 25 extend beyond said ring 29 to a further circular end plate 30 similar to the end plate 23. Here each member 25 has a radially inward extension part 31 connected to the further end plate 30. The end plate 30 is spaced a short distance inwards of the end of the casing 10 remote from the support housing 17.

Within the drum body defined by the members 25 and mesh panels 28, are three equi-angularly spaced spirals 32, each of which is attached at its one end to the plate 23 and at its outer periphery, along its length to an arcuate portion 26 of the drum, as shown in FIGS. 1 and 2. The spirals terminate at the end of ring 29. The spiral pitch varies along the length of the drum, for example as shown in FIG. 1.

Concentrically disposed in the drum 20 is a central feed tube 33. As will be described this extends from outside of the end of the casing adjacent the end plate 30, and within the drum this tube terminates short of the end plate 23. Along its length within the drum from the ring 29 to its free end, this tube 33 is connected at its outer periphery to the respective inner peripheries of the three spirals 32. The spirals are fixed to and thus supported along part of their respective lengths by the part of the feed tube 33 within the drum defined between the rings 24 and 29 and thus, in this embodiment, this central feed tube 33 rotates with the drum, in use. The spirals, being supported at both their inner and outer peripheries respectively, are thus held securely in position in the drum.

The end of the casing adjacent the outlet 15 is closed by an end plate 34. However, extending centrally through this plate 34 is a journal 35 in the form of an end of the drum, in that this journal is welded to the further end plate 30 of the drum, to which end plate the feed tube 33 is also secured, this feed tube extending through the length of the journal 35 to terminate flush therewith at a position spaced outwardly of the end plate 34 of the casing. Welded to the outside of the end plate 34 is a cylindrical support housing 36. This housing 36 has a central machined bore 37 in which is received a radial bearing 38 which carries the journal 35 at this non-driven end of the drum. The end of the tube 33 has a seal 39 and the flush ends of the tube 33 and journal 35 respectively are received in an end recess 40 of the housing 36, which recess is closed by a plate 41. This plate carries a non-rotatable feed tube 42 which is concentric with the feed tube 33 and extends into it. In this example it terminates at a position just where the feed tube 33 enters the further ring 29, although its extent into the feed tube 33 can be smaller or greater. Indeed it may be possible to omit this tube provided the mixture to be separated can be satisfactorily fed into the tube 33 by other means. The use of the tube 42 is, however, convenient in that it does provide a positive feed of the mixture into the tube 33 and provides a non-rotatable, i.e. fixed, flange 43 for connection to a conventional supply pipe.

The bearings for the journals 19 and 35 respectively are in-line, thus being relatively easy accurately to produce, and by producing the journals accurately during manufacture of the drum, previous rotation problems with prior art screens are overcome. Assisting in this improved drum rotation is the positioning of the bearing arrangement at least the non-driven end of the screen at a journal projecting from the drum and casing.

Thus, in use, operation of the drive unit 22 causes rotation of the drum 20 via the flexible coupling 21, with rotation of the drum also causing rotation therewith of the central feed tube 33, this rotation taking place at the non-drive end of the drum by way of the drum journal rotating in the bearing 38 in the support housing 36. The mixture of solid material and liquid to be separated is fed to the fixed feed tube 42, and therefrom the mixture passes into the feed tube 33, from where it is fed into the drum 20. As the drum and feed tube 33 rotate the liquid part of the mixture drains out through the mesh panels into the housing, where it drains downwardly to leave the casing through the outlet 14, to be collected or disposed of as appropriate. Simultaneously solid material is transported by the rotating spirals 32 towards the further ring 29, the transported material passing out through the open of this ring 29 to fall out of the end of the drum where the mesh panels 28 are not provided. Material thus falls through the outlet 15 to appropriate collection means.

With the screen described in FIGS. 1 to 3, the bearings at both ends of the rotatable drum are outside of the casing 10 and, particularly at the non-driven end of the drum the bearing arrangement does not come into contact with the mixture being separated, as is the case with prior art arrangements where the non-driven end of the drum is supported on a roller within the casing. Not only is such an arrangement detrimental to the roller but it also prevents flow of material to the solid outlet to some degree. A further advantage of having the bearing 38 outside of the casing is that, as mentioned, it is easier accurately to produce the journal and support housing bore by machining after initial fabrication. Where, with prior art arrangements, one or more rollers have been provided within the casing to support the drum it is difficult to ensure that the required surfaces are geometrically accurate. The present arrangement enables lubrication of the bearing at the non-driven end to be undertaken much more easily than, for example, when this is within the mixture flow within the casing.

The embodiment of the screen described is particularly advantageous where it is of a large size as compared to presently known screens, in that although of longer length it is still stable and robust due to the fact that the central feed tube and the spirals are connected together and also both rigidly connected to the drum, the drum in this sense extending to the plate 34 and having its end in the form of the outer journal 35. Although this is not an essential feature, it does strengthen the whole of such a longer screen. Alternatively not all the spirals need be connected to the tube 33.

Figure 4:
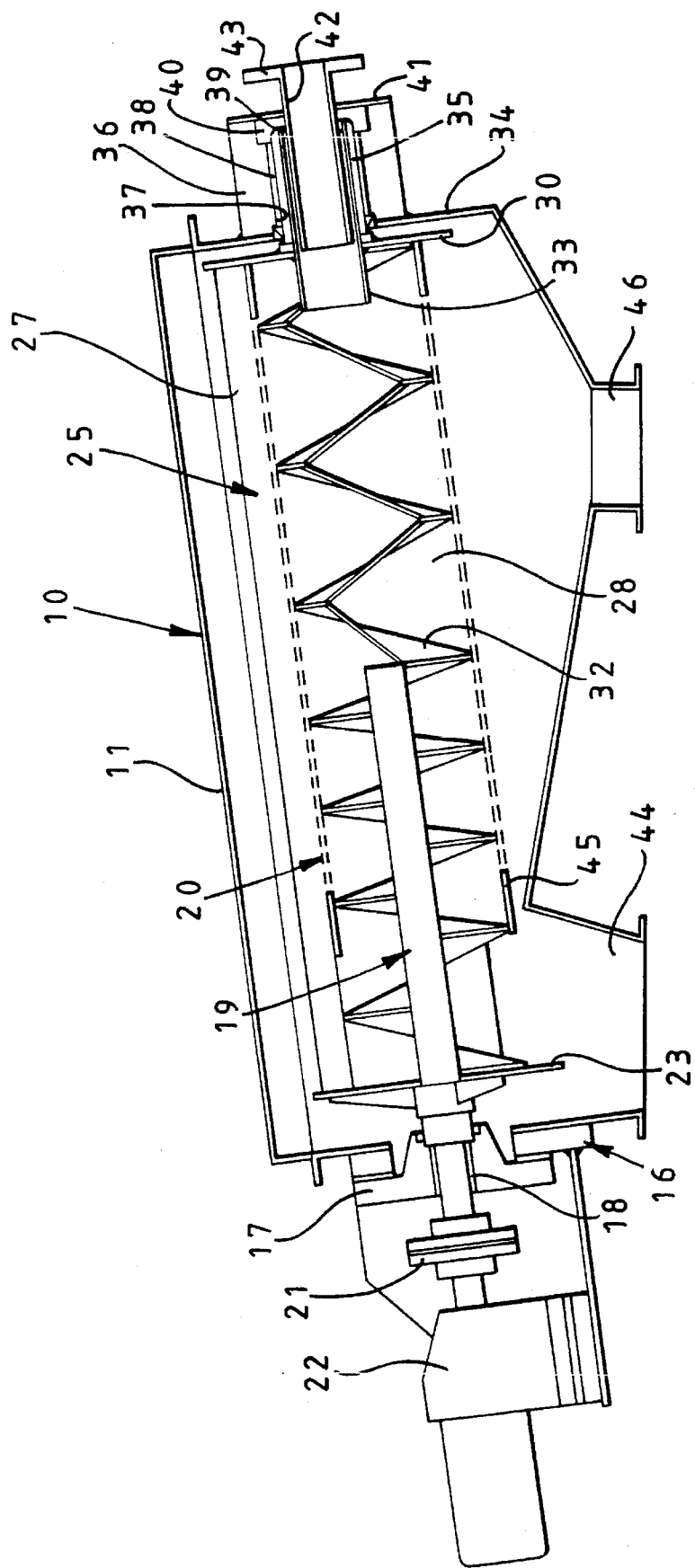
FIG. 4 is a view in the form of FIG. 1 of a further embodiment of a separator of the invention.

In the embodiment of FIGS. 1 to 3, the screen is arranged with the liquid outlet adjacent the lower end of the downwardly sloping drum. FIG. 4 shows a further embodiment of a screen of the invention, similar to the embodiment of FIGS. 1 to 3, but having its solid material outlet 44 adjacent the lower end of the downwardly sloping drum instead of at the upper end of the drum. Identical parts of this further embodiment are given the same reference numerals as used in the first embodiment described. Only one spiral of the three is shown, for clarity.

As can be seen from FIG. 4, the lower part of the casing is raised at the inner side of the outlet 44 almost up to the ring 45, but then slopes downwardly away to the liquid outlet 46, to which the lower part of the casing extending from end plate 34 also slopes downwardly, the outlets 44, 46 terminating in the same horizontal plane, and effectively being substantially isolated from one another by the casing shape.

As can also be seen from FIG. 4, the drive journal 19 extends a substantial distance into the drum and the spirals, which all extend, in this embodiment, for the whole length of the drum, are fixed at their respective inner peripheries to the journal 19. As before, the spirals are fixed at their respective outer peripheries to the arcuate portions along their length.

The central feed tube 33 is shortened so that it extends only a short distance into the drum, and similarly the fixed feed tube 42, if provided, is also shortened, terminating substantially at the plane of end plate 30. The tube 33 is fixed to at least one, and preferably all, of the spirals, despite its reduced length, although this support of the spirals could be omitted, full inner peripheral support being taken by the journal 19 alone.

In operation, the separation process is similar to that with the screen of FIGS. 1 to 3 for solid material, in that on passing out of feed tube 33 it is transported by the spirals along the drum. However, with the screen of FIG. 4 the material is carried downwardly in the drum to the lower end thereof where the members 25 and spirals 32 are still present but where the absence of the panels 28 beyond ring 45 allows the material to fall from the drum to the solid material outlet 44.

Liquid flowing into the drum from feed tubes 42 and 33 can drain through the mesh panels 28 forming the drum and be guided by the inclined lower part of the casing to the liquid outlet 46. However if the mesh is relatively fine, i.e. with small openings therein, or if the amount or nature of the solid material is such that the outflow is restricted, a build-up of liquid could occur in the drum from the end plate 30 to the plane defined at the end of the journal 19 in the drum. If the drum is not rotating, the input of further liquid will cause the liquid in the drum to spill into the first 'chamber' formed beyond the end of the journal 19 by the spirals therearound, until the level of liquid in that chamber is sufficient for liquid to 'spill over', in the manner of a weir, into the next 'chamber' and so on, liquid draining through the mesh panels of these 'chambers' wherever possible.

When this build up of liquid occurs with the drum rotating, the liquid is forced around the spirals and in this way the flow of liquid is controlled by the rate of rotation of the drum.

In an alternative form of the screen of FIGS. 1 to 3, the spirals extend beyond the ring 29 to the end plate 30. Thus instead of merely the members 25 extending over the outlet 15, the spirals now do so as well. With this form of screen the tube 42 is omitted and tube 33 is not connected to the spirals and is thus fixed, its end and the housing 36 being adapted to suit. An end part of each spiral can be of opposite hand to its remainder to prevent jamming of solids.

Also in each of the illustrated embodiments of FIGS. 1 to 3, and FIG. 4, similarly the tube 33 can be fixed relative to the drum rather than rotating therewith, and consequently the tube 42 can be omitted.

The means for moving the solid material along the drum could be other than spirals, and even if of spiral form could be non-continuous. At one or both ends of the screen, outside the casing, it could be the inlet tube forming the journal received in the bearing rather than the journal being part of the drum.

We claim:

1. A separator for separating solid material from liquid comprising:

a casing having an end, a solid material outlet for expelling said solid material from the casing, a liquid material outlet for expelling liquid material from the casing, the liquid material outlet being separate from the solid material outlet;

a drum disposed within the casing, the drum having first and second ends and an outlet, being rotatable about a drum axis at an angle relative to the horizontal and having an apertured surface for liquid to flow out of the drum, one of said first and second ends of the drum being closed;

an inlet member for supplying a mixture of solid material and liquid into the drum, the inlet member being concentric with said drum axis and being rotatable with said drum;

a feed member being fixed relative to the inlet member and concentric therewith for supplying said mixture of solid material and liquid to the inlet member, at least parts of the inlet member and the feed member respectively being disposed one within the other;

a rotary seal disposed between the inlet member and the feed member;

a first journal disposed at said first end of the drum;

a first bearing disposed outside of said end of the casing, the first journal being received in said first bearing and rotating upon rotation of said drum and inlet member, the first bearing supporting the first journal against movement in a radial direction, the inlet member extending centrally through the first bearing;

a drive disposed at said second end of the drum for rotatably driving the drum and inlet member;

a spiral member disposed within the drum for moving said solid material within the drum towards said outlet therefrom where it passes to said solid material outlet of the casing, the spiral member having inner and outer peripheries and being supported for at least part of its length at the outer periphery thereof and for at least part of its length at the inner periphery thereof;

a second journal disposed at said second end of the drum; and a second bearing in which said second journal at said second end of the drum is received, the bearing supporting the second journal against movement in any radial direction;

wherein the first and second bearing which respectively receive said first and second journals are in line.

2. A separator as claimed in claim 1, wherein the drum has a drum body member, the spiral members comprising at least one spiral or part-spiral which is supportingly connected at its outer periphery to said drum body member, and the drum comprising at least one mesh panel for outflow of liquid therefrom.

3. A separator claimed in claim 2, wherein each spiral or part-spiral and mesh panel terminates short of said first end of the drum wherein said solid material outlet of the drum is defined above said solid material outlet of the casing.

4. A separator as claimed in claim 1, wherein the spiral member comprises at least one spiral or part-spiral which is supportingly connected at its inner periphery to the inlet member.

5. A separator as claimed in claim 4, wherein the inlet member is connected to an end plate of the drum at said first end thereof.

6. A separator as claimed in claim 1, wherein said second journal extends into the drum and said spiral member is supportingly connected at its inner periphery to said second journal.

7. A separator as claimed in claim 6, wherein the inlet member projects into the drum at said first end thereof and at least one spiral or part-spiral is supportingly connected at its inner periphery to the inlet member.

8. A separator as claimed in claim 6, wherein the ,drum has a drum body member, the spiral members comprising at least one spiral or part-spiral which is supportingly connected at its outer periphery to said drum body member, and the drum comprising at least one mesh panel for outflow of liquid therefrom; and wherein each spiral or part-spiral and mesh panel terminates short of said second end of the drum wherein said solid material outlet of the drum is defined above said solid material out of the casing.

9. A separator as claimed in claim 1, wherein the first bearing supports the first journal against movement in any radial direction.

* * * * *